United States Patent
Frashure

(10) Patent No.: US 11,718,287 B2
(45) Date of Patent: Aug. 8, 2023

(54) AUTOMATED SYSTEM AND METHOD FOR PARKING A COMMERCIAL VEHICLE

(71) Applicant: Bendix Commercial Vehicle Systems LLC, Elyria, OH (US)

(72) Inventor: Timothy J Frashure, Columbia Station, OH (US)

(*) Notice: Subject to any disclaimer, the term of this patent is extended or adjusted under 35 U.S.C. 154(b) by 211 days.

(21) Appl. No.: 17/116,295

(22) Filed: Dec. 9, 2020

(65) Prior Publication Data

US 2022/0176944 A1    Jun. 9, 2022

(51) Int. Cl.
*B60W 30/06* (2006.01)
*B60W 10/18* (2012.01)
*B60W 10/20* (2006.01)

(52) U.S. Cl.
CPC ............ *B60W 30/06* (2013.01); *B60W 10/18* (2013.01); *B60W 10/20* (2013.01)

(58) Field of Classification Search
CPC ...... B60W 30/06; B60W 10/18; B60W 10/20; B60T 13/662; B60T 13/683; B60T 2201/022; B60T 7/122; B60T 2201/10; B60T 15/041
USPC ........................................................ 701/23
See application file for complete search history.

(56) References Cited

U.S. PATENT DOCUMENTS

| | | | |
|---|---|---|---|
| 4,146,107 A | 3/1979 | Ebbeson | |
| 4,660,696 A | 4/1987 | Kusaka | |
| 5,409,303 A | 4/1995 | Engelbert | |
| 5,549,363 A | 8/1996 | Kanjo | |
| 6,305,511 B1 | 10/2001 | McCann | |
| 6,917,870 B2 | 7/2005 | Howell | |
| 8,079,649 B2 | 12/2011 | Eberling | |
| 8,820,856 B2 | 9/2014 | Rogers | |
| 9,028,011 B2 | 5/2015 | Kaupert | |
| 9,694,800 B2 | 7/2017 | Zula | |
| 10,272,890 B2 | 4/2019 | Carritte | |
| 2003/0192751 A1 | 10/2003 | Costa | |

(Continued)

FOREIGN PATENT DOCUMENTS

| | | |
|---|---|---|
| CN | 204845912 U | 12/2015 |
| CN | 107709108 A | 2/2018 |

(Continued)

OTHER PUBLICATIONS

European Patent Office, International Search Report and Written Opinion, Report, dated Feb. 21, 2022, 12 pages, European Patent Office, Rijswijk Netherlands.

*Primary Examiner* — Jonathan M Dager
*Assistant Examiner* — Jean W Charleston
(74) *Attorney, Agent, or Firm* — Cheryl L. Greenly; Brian E. Kondas; Eugene E. Clair

(57) ABSTRACT

A system for automatically parking a commercial vehicle comprises a service brake system having at least one braking valve, a braking controller for controlling the service brake system, and an advanced driver assistance system (ADAS) controller. The ADAS controller communicates with the braking controller and requests activation of the service brakes of the commercial vehicle until the vehicle is stationary. The braking controller, in response to the ADAS controller requesting activation of the service brakes, determines the commercial vehicle should remain stationary and activates at least one braking valve to exhaust system pressure to mechanically park the vehicle.

14 Claims, 3 Drawing Sheets

(56) References Cited

U.S. PATENT DOCUMENTS

| | | |
|---|---|---|
| 2006/0225971 A1 | 10/2006 | Jaeger |
| 2008/0245597 A1* | 10/2008 | Paulson .................. B60T 7/22 |
| | | 180/275 |
| 2008/0284240 A1 | 11/2008 | Jeong |
| 2010/0252378 A1 | 10/2010 | Hilberer |
| 2017/0267222 A1* | 9/2017 | Antunes ................ B60T 13/36 |
| 2018/0319402 A1* | 11/2018 | Mills .................... B60W 30/14 |
| 2019/0245349 A1 | 8/2019 | Wulf |
| 2019/0248349 A1* | 8/2019 | Wulf ................... B60W 10/184 |
| 2019/0256061 A1 | 8/2019 | Nemeth |
| 2019/0258251 A1* | 8/2019 | Ditty .................... G05D 1/0274 |
| 2020/0047737 A1 | 2/2020 | Balogh |
| 2020/0070795 A1 | 3/2020 | van Thiel |
| 2020/0406875 A1* | 12/2020 | Carritte ................ B60T 11/108 |
| 2021/0155216 A1* | 5/2021 | Bensch ................. B60T 13/68 |
| 2021/0162972 A1* | 6/2021 | Schnittger ............. B60T 15/02 |
| 2021/0171003 A1* | 6/2021 | Uraoka ................. B60T 13/741 |
| 2021/0221341 A1* | 7/2021 | Galizzi .................. B60T 13/74 |
| 2021/0256846 A1* | 8/2021 | McErlean ............. G07C 5/008 |
| 2021/0269008 A1* | 9/2021 | Schnittger ................ B60T 7/20 |
| 2021/0276522 A1* | 9/2021 | Harrison ............... B60T 15/246 |
| 2021/0277995 A1* | 9/2021 | Hutchins ................ B60T 7/122 |
| 2022/0063655 A1* | 3/2022 | Clasen .................. G01S 13/867 |
| 2022/0080958 A1* | 3/2022 | Song .................... G06V 10/147 |

FOREIGN PATENT DOCUMENTS

| | | | |
|---|---|---|---|
| CN | 106347332 B | 10/2019 | |
| DE | 4004149 A1 | 8/1991 | |
| DE | 4327759 C2 | 7/1996 | |
| DE | 102017000192 A1 | 7/2018 | |
| EP | 2998177 B1 | 5/2019 | |
| EP | 3569459 A1 | 11/2019 | |
| GB | 2173560 B | 10/1989 | |
| JP | 5252996 A | 8/1997 | |
| JP | 2009113803 A * | 5/2009 | ............ B60T 13/385 |
| JP | 2009113803 A | 5/2009 | |
| JP | 5743655 B2 | 7/2015 | |
| JP | 6267901 B2 | 1/2018 | |

\* cited by examiner

AUTOMATED SYSTEM AND METHOD FOR PARKING A COMMERCIAL VEHICLE

BACKGROUND

The present application relates to a commercial vehicle having an advanced driver assistance system and an electronically controlled service braking system and a method to park such a vehicle. Commercial vehicles are generally equipped with electronically controlled braking systems that provide anti-lock, traction and stability control during service braking. Increasingly, commercial vehicles are also equipped with advanced driver assistance systems (ADAS), which provide adaptive cruise control and collision mitigation functions. ADAS is capable of actuating the service brakes independent of driver input. However, most commercial vehicles still have a pneumatic only parking brake system that must be manually engaged and released.

ADAS communicates with the electronically controlled braking system to slow the vehicle using the service brakes under certain circumstances. However, ADAS may make the vehicle stationary and release control of the service brakes before the driver is fully in control of the vehicle. In these instances, the vehicle may need to be maintained in the stationary condition. Accordingly, those skilled in the art continue with research and development efforts in the field of service braking and parking brake systems.

SUMMARY

In accordance with one embodiment, a system for automatically parking a commercial vehicle comprises a service brake system having at least one braking valve, a braking controller for controlling the service brake system, and an advanced driver assistance system (ADAS) controller. The ADAS controller communicates with the braking controller and requests activation of the service brakes of the commercial vehicle until the vehicle is stationary. The braking controller, in response to the ADAS controller requesting activation of the service brakes, determines the commercial vehicle should remain stationary and activates at least one braking valve to exhaust system pressure to mechanically park the vehicle.

In another embodiment, a method of a method for automated parking of a commercial vehicle comprises transmitting a message from an advanced driver assistance system (ADAS) controller to a braking controller requesting activation of the service brakes until the commercial vehicle is stationary. The method further comprises determining that the commercial vehicle should remain stationary and activating a braking valve to exhaust the parking brake actuator to mechanically park the commercial vehicle.

DETAILED DESCRIPTION

Figure 1:
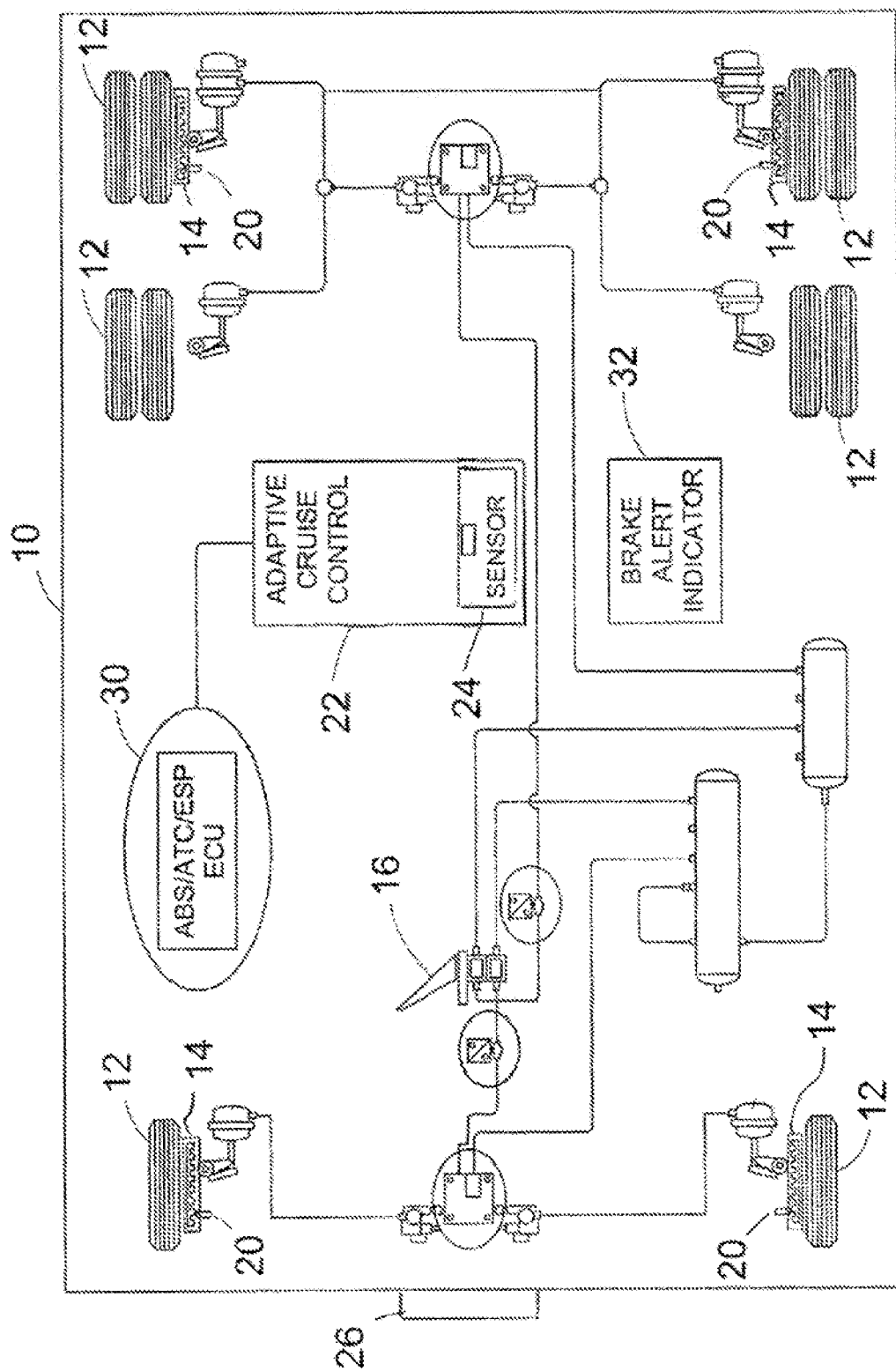
FIG. 1 is a braking system schematic.

Referring to FIG. 1, a commercial vehicle pneumatic braking system 10 is shown. The braking system 10 includes six wheel ends 12a, 12b, 12c, 12d, 12e, 12f, but may include more or fewer wheel ends based on the configuration of the vehicle. In this example, each wheel end 12a, 12b, 12c, 12d includes a service brake actuator 14a, 14b, 14c, 14d for translating pneumatic pressure into longitudinal motion to actuate the friction brakes. The friction brakes may be drum brakes or air disc brakes. Service brake actuation occurs when the driver steps on a brake pedal 16 or when requested by an automated system on the vehicle.

Wheel ends 12e, 12f include parking brake actuators 18a, 18b. The parking brake actuators 18a, 18b perform both a service brake and a parking brake function. Parking brake actuators 18a, 18b include parking brake springs that must be compressed by air pressure when the vehicle is to be unparked. When the air pressure in the system is below a predetermined pressure, also known as a parking brake activation pressure, the parking brake springs will mechanically engage and prevent the vehicle from moving. The air for actuating the service brakes and releasing the parking brakes is sourced from reservoirs 44a, 44b.

The braking system 10 includes a braking controller 30. The braking controller 30 has control logic 31 for receiving signals from sensors such as yaw rate/accelerometer 24, pressure sensors 42a, 42b and wheel speed sensors 20a, 20b, 20c, 20d. The control logic 31 performs braking functions such as antilock control, stability control and traction control by transmitting electronic control signals directly to braking control valves 34a, 34b. In one example, the braking control valves 34a, 34b are traction control valves 36a, 36b and modulator valves 38a, 38b, 38c, 38d. The traction control valves 36a, 36b are pneumatically connected to the reservoirs 44a, 44b. In another example, the braking control valves 34a, 34b are electropneumatic braking (EBS) valves. The braking control valves 34a, 34b can be a combination of solenoid valves and relay valves.

The control logic 31 also communicates with an engine controller 40 on a serial communications bus 28 to dethrottle the engine to assist in slowing the vehicle.

The braking system 10 includes an automated driver assistance (ADAS) controller 22. The ADAS controller 22 has control logic 23 for receiving signals from a sensor 26, which may be a radar or a camera or both. The control logic 23 performs functions such as lane keeping, adaptive cruise control and collision mitigation by communicating with both the braking controller 30 and engine controller 40 via the serial communications bus 28 or other means.

When the ADAS controller 22 determines that a brake intervention must be made to avoid a collision, for example, the ADAS controller 22 transmits control messages to the braking controller 30, which in turn activates the service brakes according to the request. In some instances, the ADAS controller 22 determines that the vehicle must be slowed or even brought to a full stop. Once the vehicle is brought to a full stop, if there are no more instructions from the ADAS controller 22, then the braking controller 30 may release the service brakes. If the driver does not have his foot on the brake pedal 16 or on an accelerator pedal (not shown) to continue to drive the vehicle, this action of releasing the service brakes by the braking controller 30 could result in the vehicle unintentionally rolling away.

In one example, at the end of the automated action of the ADAS controller 22, the present inventive system will detect that the driver does not have his foot on the brake pedal 16 via the pressure sensors 42a, 42b and initiate the parking brake sequence of this invention. In another example, the braking controller 30 detects that the driver does not have his foot on the brake pedal 16 and also does not have his foot on the accelerator pedal. Alternatively, the driver may have his foot on the brake pedal 16 but the braking controller 30 determines that there is not enough service braking force applied because the vehicle is beginning to roll. Vehicle roll may be determined by receiving greater than zero wheel speed from sensors 14a, 14b, 14c, 14d, 14e, 14f.

In another example, the braking controller 30 detects that the vehicle is stationary due to the action of the ADAS controller 22 through receiving zero wheel speed from sensors 14a, 14b, 14c, 14d, 14e, 14f. In another example, the braking controller 30 determines that the vehicle is stationary through receiving information from sensor 26. In yet another example, the braking controller 30 may determine that the vehicle should remain stationary after the ADAS controller 22 completes its action because the driver is not visible in a driver facing camera (not shown).

The braking system 10 does not include an automatic parking brake controller, so the parking brakes must still be applied and released mechanically through the action of the braking controller 30.

Therefore, a system for automatically parking a commercial vehicle comprises a service brake system having at least one braking valve, a braking controller for controlling the service brake system, and an advanced driver assistance system (ADAS) controller. The ADAS controller communicates with the braking controller and requests activation of the service brakes of the commercial vehicle until the vehicle is stationary. The braking controller, in response to the ADAS controller requesting activation of the service brakes, determines the commercial vehicle should remain stationary and activates at least one braking valve to exhaust system pressure to mechanically park the vehicle.

Figure 2:
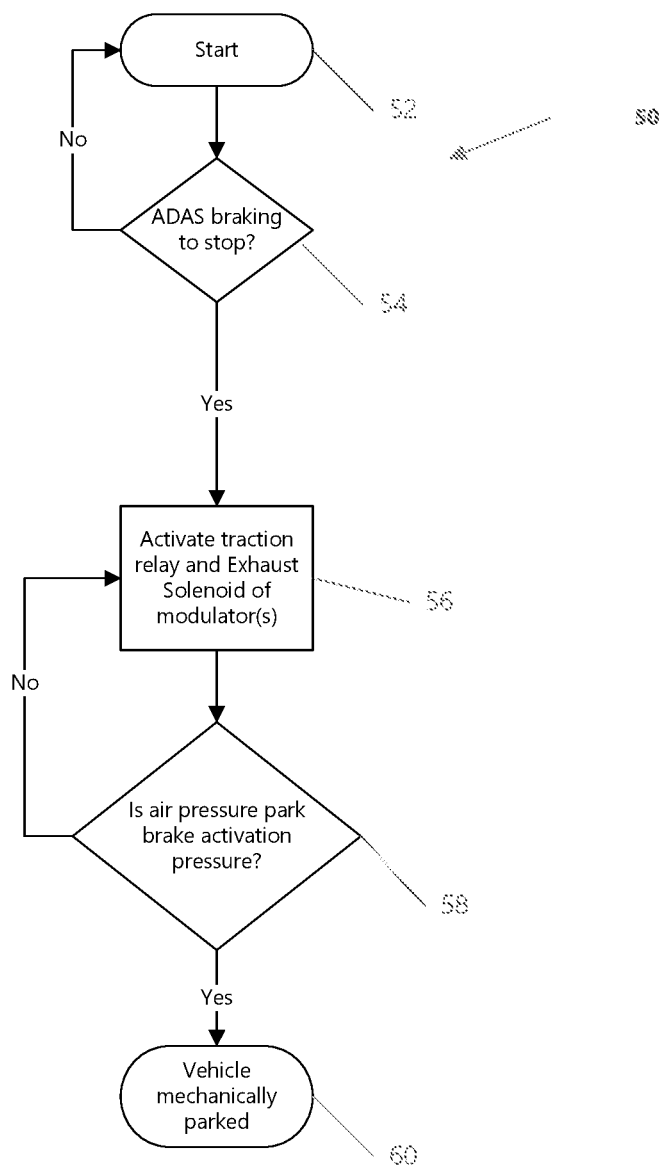
FIG. 2 is a method of implementing the automated parking system, according to one example of the invention.

Referring to FIG. 2, a first method 50 of automatically parking a commercial vehicle that does not have an automatic parking brake system begins at step 52. In step 54, the ADAS control logic 23 determines whether the vehicle must be brought to a stop to complete the automated action securely. If the automated brake action required is temporary and does not bring the vehicle to a stop or the system 10 determines that the driver is in full control of the vehicle via the brake pedal 16 or accelerator pedal, the method 50 returns to step 52.

The method 50 otherwise continues to step 56. The ADAS controller 22 will communicate with the braking controller 30, while the braking controller 30 determines if the vehicle needs parking brake intervention to maintain the vehicle as stationary.

In step 56, the braking controller 30 will activate the braking valves 34a, 34b once it determines that the vehicle must remain stationary (e.g. driver does not have his foot on the brake pedal 16). In one example, the traction relay 36a and the exhaust solenoid of the modulators 38a, 38b are actuated together to create a pathway for the air supply from the source, reservoirs 44a, 44b, to atmosphere. In another example, both of the traction relays 36a, 36b and all of the exhaust solenoid of the modulators 38a, 38b, 38c, 38d are actuated at the same time.

During activation, the braking controller 30 will determine if the pressure in the reservoirs 44a, 44b is less than or equal to a predetermined pressure as in step 58. The braking controller 30 may measure the pressure directly from a pressure sensor (not shown) or receive the pressure on the serial communications bus 28. In one example, the predetermined pressure for parking brake actuation is between about 60 psi and about 80 psi. If the air pressure in the reservoirs is greater than or equal to the predetermined pressure, the method 50 returns to step 56 to continue to actuate the braking valves 34a, 34b.

Once the air pressure in the reservoirs 44a, 44b is less than the predetermined pressure, the parking brake actuators 18a, 18b will apply the parking spring, thereby holding the vehicle stationary using the parking brakes, as in step 60.

The vehicle will remain parked until the system pressure in reservoirs 44a, 44b is increased above a second predetermined pressure and the driver manually releases the parking brakes. In one example, the second predetermined pressure is above about 80 psi.

Figure 3:
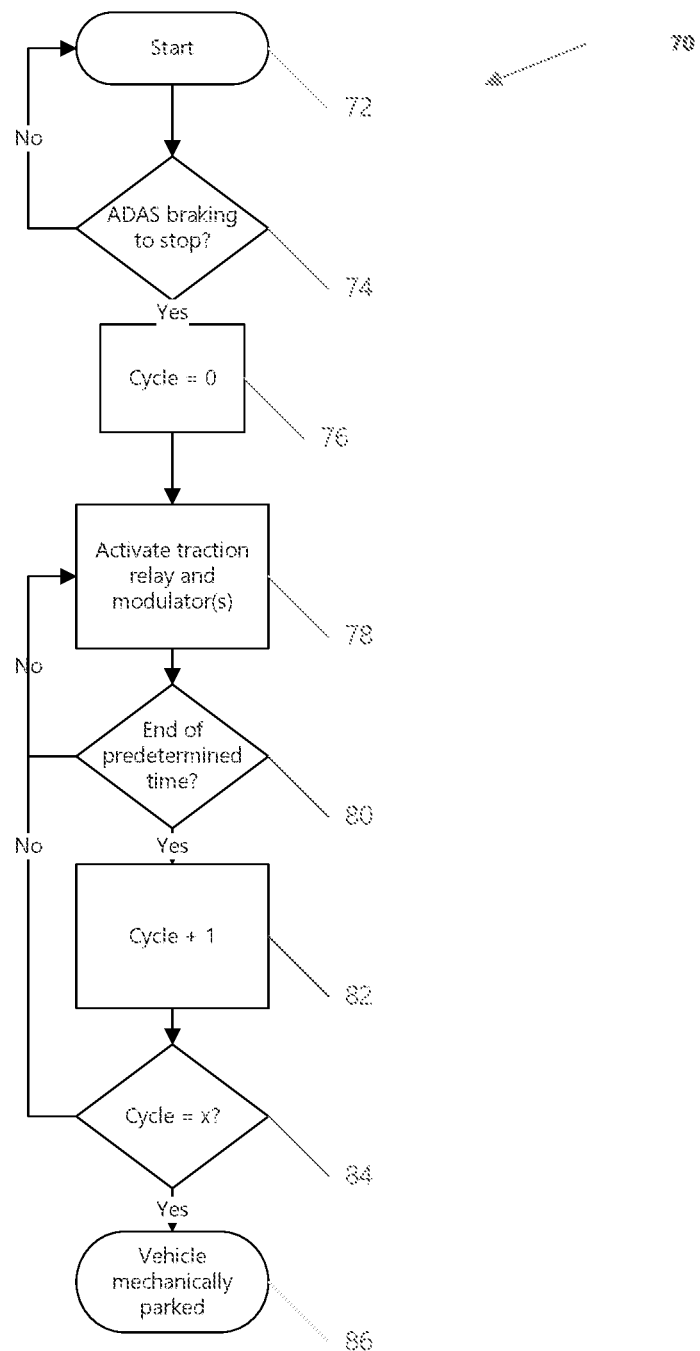
FIG. 3 is a method of implementing the automated parking system, according to a second example of the invention.

Referring to FIG. 3, a second method 70 of automatically parking a commercial vehicle that does not have an automatic parking brake system begins at step 72. In step 74, the ADAS control logic 23 determines whether the vehicle must be brought to a stop to complete the automated intervention action securely. If the automated brake action required is temporary and does not bring the vehicle to a stop, the method 70 returns to step 72.

The method 70 otherwise continues to step 76. The ADAS controller 22 will communicate with the braking controller 30 and the engine controller 40 on the serial communications bus 28 or other means. The braking controller 30 determines if the vehicle needs parking brake intervention to maintain the vehicle as stationary.

In step 76, a cycle counter is set to zero in the braking controller control logic 31. The braking controller 30 will activate the braking valves 34a, 34b in step 78. In one example the traction relay 36a and the exhaust solenoid of the modulators 38a, 38b are actuated together to create a pathway for the air supply from delivery to atmosphere. In another example, each of the traction relays 36a, 36b and all of the exhaust solenoid of the modulators 38a, 38b, 38c, 38d are actuated at the same time. The activation is maintained until the end of a predetermined time, as in step 80. The predetermined time will vary based on the commercial vehicle pneumatic system configuration. However, the predetermined time can be between about one second and about fifteen seconds. At the end of the predetermined time, the cycle counter in the control logic 31 is incremented by 1 in step 82.

In step 84, the cycle counter is compared to a predetermined number of cycles. In one example, the predetermined number of cycles is five cycles. One cycle is approximately one second. If the cycle counter is less than the predetermined number of cycles, the method 70 returns to step 78 to activate the brake valves 34a, 34b again. If the cycle counter equals the predetermined number of cycles, the method 70 continues to step 86, where the vehicle is mechanically parked. The predetermined time and predetermined numbers of cycles are tuned for the type of vehicle, knowing that it takes that amount of time to reduce the system pressure to mechanically activate the brakes. The pressure in the reservoirs 44a, 44b does not need to be measured using method 70.

Both the methods 50 and 70 can be interrupted by a driver action, such as pressing on the accelerator pedal or providing enough force from depression of the service brake pedal.

Therefore, a method for automated parking of a commercial vehicle comprises transmitting a message from an advanced driver assistance system (ADAS) controller to a braking controller requesting activation of the service brakes until the commercial vehicle is stationary. The method further comprises determining that the commercial vehicle should remain stationary and activating a braking valve to exhaust the parking brake actuator to mechanically park the commercial vehicle.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A system for automatically parking a commercial vehicle comprising:
   a service brake system having at least one braking valve;
   a braking controller for controlling the service brake system; and
   an advanced driver assistance system (ADAS) controller, communicating with the braking controller; wherein the ADAS controller requests activation of the service brakes of the commercial vehicle until the commercial vehicle is stationary and the braking controller, in response to the ADAS controller requesting activation of the service brakes, determines the commercial vehicle should remain stationary after the ADAS controller discontinues requesting activation of the service brakes and activates the at least one braking valve to exhaust system pressure to mechanically park the commercial vehicle.

2. The system as in claim 1, wherein the braking valve is combination of a traction relay valve and a modulator valve.

3. The system as in claim 1, wherein the braking valve is activated until the system pressure is less than a parking brake activation pressure.

4. The system as in claim 3, wherein the parking brake activation pressure is between about 60 psi and about 80 psi.

5. The system as in claim 1, wherein the braking valve is activated cyclically for a predetermined period of time to exhaust system pressure.

6. The system as in claim 5, wherein the number of cycles of activation is tuned for the commercial vehicle to achieve a system pressure less than a parking brake activation pressure.

7. The system as in claim 5, wherein the predetermined period of time is between about one second and about fifteen seconds.

8. A method for automated parking of a commercial vehicle comprising:
   transmitting a message from an advanced driver assistance system (ADAS) controller of the commercial vehicle to a braking controller of the commercial vehicle requesting activation of service brakes until the commercial vehicle is stationary;
   determining that the commercial vehicle should remain stationary after the ADAS controller discontinues requesting activation of the service brakes; and
   activating a braking valve to exhaust the parking brake actuator to mechanically park the commercial vehicle.

9. The method as in claim 8, further comprising: determining if a system pressure is less than a predetermined pressure and continuing to activate the braking valve until the system pressure is less than the predetermined pressure.

10. The method as in claim 8, further comprising cyclically activating the braking valve for a predetermined amount of time until a predetermined number of cycles are completed.

11. The method as in claim 10, wherein the predetermined number of cycles are related to causing the system pressure to be less than the predetermined pressure.

12. The method as in claim 10, wherein the predetermined number of cycles is five cycles.

13. The system as in claim 1, wherein the braking controller determines that the commercial vehicle should remain stationary in response to receiving at least one of a greater than zero wheel speed, an indication that a driver does not have his foot on a service brake pedal or an accelerator pedal and an indication that the driver is not visible from a driver facing camera.

14. The method as in claim 8, wherein determining that the commercial vehicle should remain stationary includes receiving at least one of a greater than zero wheel speed, an indication that a driver does not have his foot on a service brake pedal or an accelerator pedal and an indication that the driver is not visible from a driver facing camera.

* * * * *